Figure 1:
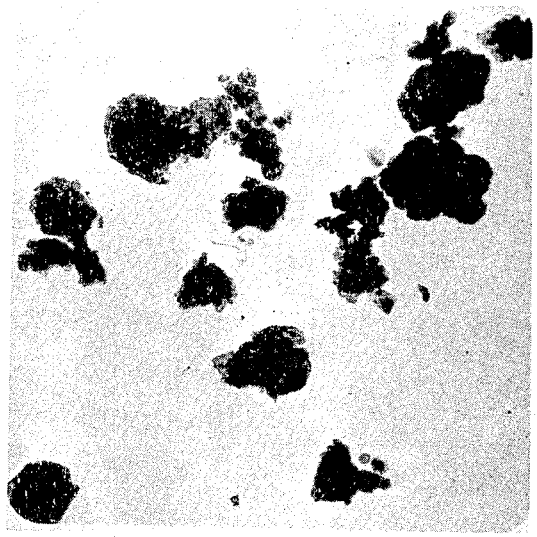

Inventors
ROBERT K. MAYS
ORLANDO L. BERTORELLI

By Albert C. Johnston

Attorney

United States Patent Office 3,328,125
Patented June 27, 1967

3,328,125
REACTIVE SELECTIVELY SORPTIVE SILICA MATERIALS AND PROCESS OF PRODUCING THEM
Robert K. Mays and Orlando Leonard Bertorelli, both of Havre de Grace, Md., assignors to J. M. Huber Corporation, Borger, Tex., a corporation of New Jersey
Filed Nov. 3, 1961, Ser. No. 149,964
7 Claims. (Cl. 23—182)

This invention relates to new particulate silica materials having distinctive chemical and physical characteristics and distinctive properties, including extremely high chemical reactivities and uniquely selective powers of sorption for substances of certain molecular sizes. The invention relates also to a process of producing such materials.

Finelly divided siliceous materials of various kinds have been known heretofore. Among those which have found important uses as inorganic fillers, carriers, extenders or pigments are:

(1) The natural crystalline silicates or clays, such as kaolin;

(2) Finely pulverized quartz, which is a crystalline silica of little chemical reactivity composed of $SiO_4$ tetrahedra spirally linked into hexagonal prism structures;

(3) Precipitated silicic acid compositions, or hydrated silicas, which have $SiO_4$ tetrahedra and OH groups chaotically linked into minute spherical microcrystalline amorphous masses that tend to flock together;

(4) Pyrogenic or fumed silicas, which are discrete, anhydrous, spherical colloidal masses formed principally by siloxane (Si-O-Si) groupings; and (5) Very finely divided precipitated sodium aluminum silicates, such as those disclosed in United States Patent No. 2,739,073.

It has long been known that more or less impure siliceous materials are obtained as residues in the reaction slurries when particulate hydrous aluminum silicates such as kaolin or similar clays, either in the hydrous state or after calcination, are reacted in aqueous media with strong mineral acids for the extraction of alumina from the silicates, such, for example, as when reacting clay with sulfuric acid for the production of alum. Although there have been various proposals for producing or treating the residues so as to recover them in useful forms, these siliceous materials, or so-called silica residues, commonly have been separated from the reaction slurries and discarded for lack of substantial commercial value. As disclosed in U.S. Patent No. 2,848,346, however, an alum solution produced from kaolin and still containing the silica residue may be used successfully by reaction with sodium silicate for the production of a precipitated sodium aluminum silicate pigment of increased $SiO_2$ content.

According to the present invention, we have discovered that silica materials can be provided in an extremely reactive and sorptive particulate form in which the particles, unlike those of known particulate siliceous materials, are quite discrete paracrystalline particles having a distinctly hexagonal phylloidal or wafer structure characterized, among other things, by a very great width to thickness ratio, or thinness, extremely high porosity in the particles themselves and unique properties of chemical reactivity and of selective sorptiveness. The composition, form and properties of the particles make these new materials valuable for many important uses.

The silica materials according to the invention consist essentially, by analysis, of silica and bound water with small amounts of other mineral oxides. They contain at least 75%, advantageously 83% or more, by weight of $SiO_2$, based upon their weight when dry at 105° C., together with at least 5% of bound or combined $H_2O$ and less than 15%, advantageously less than 10%, of other oxides.

Structurally, the atoms of silicon, oxygen and hydrogen are linked in orderly laminar networks giving the individual particles their distinctly hexagonal phylloidal form and a very great surface area constituted for the most part by porosity in the particles, and providing at their surfaces reactive silanol (SiOH) groups to a concentration of more than 20 micromols per square meter of their flat surface area, i.e., that portion of their surface area which is not constituted by porosity.

The particles of the new materials have variegated facial dimensions in the range of from about 0.1 to about 5 microns. The preponderant particle widths are generally of about 0.5 to 2 microns. Their thicknesses are far smaller, ranging typically from as little as about .003 micron to about .020 micron (i.e., 30 to 200 Angstrom units). As shown, for example, by stereoptic and shadowgraphic electron micrographs, the preponderant thickness generally amounts to only about .004 to .008 micron. Thus the particles have an extremely high characteristic width to thicknes ratio, of the order of magnitude of 250 to 1.

The BET surface area of the materials, as determined by the well-known Brunauer, Emmett and Teller method ("BET Multilayer Absorption Theory," Journal of the American Chemical Society, vol. 60 (1938), p. 309), generally is in the range of 300 to 500 square meters per gram and for the most valuable materials is about 350 to 470 square meters per gram. The most finely divided refined kaolins, in contrast, have a BET surface area of about 15 square meters per gram, while precipitated silicic acid pigments generally have BET surface areas in the range of 70 to 200 square meters per gram.

The materials according to the invention are further unlike known materials in that their total surface area is constituted to more than 60%, and to 85 to 92% or more in the most valuable species, by measurable porosity in the elementary particles. The porosity appears to exist as gaps or interstices in the atomic networks forming the particle structure. Moreover, from about 50% to about 80% of the surface area is formed by pores having dimensions of less than 20 Angstrom units (.002 micron), as determined by recognized analytical methods (A. Voet, "Determination of Pore Size Distribution," Rubber World, vol. 139 (1958), pp. 63, 232). These pores are located in positions which parallel the three crystallographic axes of the particles. They give the materials a unique selective power of sorption, making them highly receptive to substances having molecular dimensions of about 19 Angstrom units or smaller and relatively unreceptive to substances of larger molecular size.

The extremely high chemical reactivity of the new silica materials is readily manifested by the rate and extent of their reaction with bases in dilute aqueous solutions. For example, when these materials are reacted at a concentration equivalent to 39.6 grams of $SiO_2$ per liter in a 1-normal solution of NaOH (containing 31.5 grams of $Na_2O$ per liter) at 50° C., at least 80% of their $SiO_2$ content generally is dissolved by the solution within 30 minutes. Those of the materials which contain more than 83% of $SiO_2$ are so reactive that 90 to 97% of their $SiO_2$ content is thus dissolved within 30 minutes.

The high reactivity of the materials is attributable to a distinctive morphological structure of the siliceous particles. The particles are paracrystalline, in that although they have an orderly arrangement of their constituents their X-ray diffractograms display a broad amorphous band having no identifiable crystal characteristics. They appear to be formed of tetrahedral $SiO_4$ groups linked together hexahedrally in laminar networks through the mutual sharing of four oxygen atoms by internal silicon atoms and the mutual sharing of three oxygen atoms by peripheral silicon atoms, the fourth valences of peripheral silicon atoms being satisfied by hydroxyl radicals so that these atoms form parts of peripheral silanol (SiOH) groups. Calculations from analytical data indicate that the silanol concentration in the particles generally is greater than 20 micromols per square meter of their flat surface area.

Among the uses of the new silica materials are many which may be served, though more expensively, by some of the known materials mentioned hereinbefore, and others which are not served effetcively by known materials. Their reactivity makes them useful, for example, for the production of more valuable silicates by direct reaction of them with various bases, including alkali metal oxides, calcium, magnesium and other alkaline earth metal oxides, and other basic metal oxides such as zinc and lead oxides. Their chemical and surface characteristics make them useful as preferential absorbing agents for moisture, as in the conditioning of table salt; also, for the sorption of various gases, vapors, odors and liquids, and as carriers for chemicals such as rubber accelerators or antioxidants, insecticides, fungicides, or the like. They are also useful as fillers, pigments or extenders in various compositions, including rubber, plastics and other polymers, ceramics, adhesives, paints, inks, paper, paper coatings, glass compositions, and the like.

Surprisingly, it has been discovered that the new materials will react directly and quite actively in finely divided solid state with finely divided barium, calcium, zinc, lead or magnesium oxide to form the corresponding metal silicate in a definite particulate form which is substantially free of soluble salts and can be produced far less expensively than the most nearly comparable metal silicates heretofore available. This solid state reaction can be effected by simply suspending the solids in an aqueous medium and heating the suspension, for example, to 90° to 100° C., although lower temperatures may be used with longer reaction times and high temperatures for faster reactions. The particles of the metal silicates thus obtained have extremely high porosities along with other important characteristics, including discreteness and extremely high width to thickness ratios, carried over into them from the silica material. A violent exothermic reaction occurs in the course of heating the material with magnesium oxide in an aqueous medium, and a heating period of 1 to 1½ hours at 90° C. yields in the medium a finely divided, definitely crystalline, porous magnesium silicate having an extremely high BET surface area of, for example, about 450 to 600 square meters per gram.

Furthermore, it has been found that the materials can be reacted or condensed with primary and secondary alcohols, for example, with butanol, decanol or octadecanol, in a pressure vessel at temperatures of, for example, 200° to 240° C., to form valuable esterified silicas or so-called estersils which retain the leaf-like particle characteristics of the original silica material and yet have most of its silanol groups, for example, at least 90% of them, reacted with the esterifying agent.

Still further, it has been found that by simply digesting the materials with sodium aluminate in an aqueous medium at about 90° to 100° C. a sodium aluminum silicate is readily produced in a distinctly cubic particle form having an orderly crystalline structure permeated with pores of definite size. This product is sorptive to moisture at elevated temperatures and valuable for use in the separation of gases of different molecular sizes.

Still further, the materials react directly and quickly with liquid alkali silicates upon being mixed and heated with them, to produce silicates of increased $SiO_2$ content, such, for example, as liquid sodium silicates having a $Na_2O$ to $SiO_2$ ratio of 1 to 4 or more, and solid sodium silicates having a $Na_2O$ to $SiO_2$ ratio of 1 to about 5. This capacity of the new materials makes them valuable for use in paperboard and boxboard adhesives and in silicate coating compositions such as are used for roofing granules, asbestos shingles, and analogous products.

According to a further aspect of the invention, we have discovered that the reactive, selectively sorptive silica materials herein described can be produced by the direct acid decomposition under atmospheric pressure conditions, through a violent exothermic reaction and an ensuing digestion treatment, of a finely particulate metal silicate anhydride suspended in an aqueous medium, when the anhydride used is a suitable product of the high temperature heat treatment of calcination of a hydrous metal silicate of finely particulate form. The acid required for the process is a strong mineral acid capable of bringing about a violent exothermic reaction in the aqueous suspension of the anhydrous metal silicates, such, for example, as sulfuric acid. Nitric acid or hydrochloric acid or hydrogen chloride gas may also be used.

The silica materials can be produced quite advantageously by the use of extremely finely divided clays such as kaolin as the raw material. Kaolin is a naturally occurring hydrous aluminum silicate. In this way, a relatively inexpensive raw material will yield not only a more valuable new silicate material but also a solution of an aluminum salt that is useful either as such or as a raw material for the production of other substances; for example, as a source of alum when sulfuric acid is used or, when nitric acid is used and is regenerated from the solution, as a source of alumina valuable for use in the production of aluminum or of other aluminum compounds.

In a process found effective for the production of the materials, a very finely particulate metal silicate, for example, a finely divided hydrous aluminum silicate such as a refined kaolin clay having its particles reduced to practically their elemental sizes, is first calcined by heating the material at a temperature between 500° and 925° C. for a period sufficient at least to render the silicate completely anhydrous. The resulting finely particulate anhydride is then suspended in an aqueous medium and reacted therein under atmospheric pressure conditions with a strong mineral acid, such as sulfuric acid, at a concentration sufficient to bring about a violent exothermic reaction in the mixture, which reaction is so violent that it requires limitation in order to keep the mixture in control. After this reaction has subsided, the mixture is digested for a period of hours at a temperature of 90° to 100° C., until more than 80% of the metal oxide content of the particles has been extracted and the resulting solid particles have attained the required high content of $SiO_2$. Then the suspended residual particles are separated from the reaction liquid, washed to remove soluble substances and dried.

The heating temperature most effective for the calcination is about 700° to 900° C., and then most effective heating time in the use of batch calcination, such as in a muffle furnace, is generally at least 2 hours at 700° C., being longer for lower effective temperatures and shorter, if desired, for higher effective temperatures. The heating may be effected continuously by the use of a rotary kiln, a vertical kiln, or a fluidized bed calciner, any of which may be operated at, for example, 800° C. to give in a relatively short heating period the effects of a longer period of heating at the same temperature in a batch calciner.

The resulting heat treated material is an anhydrous aluminum silicate that still has the appearance of kaolin particles when examined by electron micrographs, and which displays no appreciable chemical reactivity to a 1-normal solution of NaOH nor any appreciable porosity by nitrogen absorption tests. This material is crushed or otherwise disintegrated and then dispersed thoroughly in water; whereupon acid is added to the aqueous suspension and reacted with the suspended particles therein, under atmospheric pressure, at a concentration sufficient to produce the violent exothermic reaction in the reaction mixture.

The amount of acid required is in excess of 90% of the amount stoichiometric to the alumina content of the silicate. To obtain the desired products with economical utilization of the final liquid medium for the recovery of its aluminum content, the amount of acid used should be about 95 to 100% of such stoichiometric amount. While larger of acid may be used, they do not contribute significantly to the quality of the silica material and may even be somewhat detrimental to its properties if as large as 120% of such stoichiometric amount; and in the use of sulfuric acid they leave objectionable amounts of free acid in the by-product aluminum sulfate.

In the formation of the acid reaction mixture, the amount of water used for suspension of the silicate particles is related to the amount and concentration of the acid added, so as to provide, preferably, an acid concentration of 30 to 50% in the aqueous medium of the mixture. A lower acid concentration of as little as 20% or less may, however, be used in some cases, but at the expense of a much longer time for development of the required violent exothermic reaction.

The acid preferably is added in quite concentrated form, in order to take advantage of its heat of dilution. In the use of concentrated sulfuric acid, the heat of dilution is sufficient to raise the temperature of the reaction mixture, for example, from 20 to 30° C. to 75 to 85° C. Then, typically within 2 to 3 minutes after the acid is added, the violent exothermic reaction "kicks off" promptly, without any need for external heating, and the temperature of the mixture climbs abruptly from the values existing when the acid has been added to values in excess of 100° C.

This exothermic reaction and the attendant fast generation of heat everywhere within the reaction mixture are accompanied by violent boiling and frothing action which causes the mixture to expand and its level to rise in the reaction vessel. A very tall vessel is needed to contain the reaction. In mass production, however, even this does not suffice to prevent the reaction from going out of control or the mixture from becoming excessively frothed. The reaction can, however, be contained and controlled effectively by allowing the violent boiling to bring the mixture to a volume of not more than about 3 to 5 times its normal volume and then extracting from the mixture the excess heat continuing to be generated in it, so that it will not boil up in an uncontrolled condition.

The control of the frothing can be effected advantageously by the intermittent addition of relatively cold water to the violently reacting mixture. The water is distributed over the turbulent surface of the mixture, as by delivering it quickly through spray nozzles supplied from quick-opening valves. The added water not only absorbs excess heat of the reaction but also keeps the liquid medium sufficiently aqueous notwithstanding losses of its water content which occur, especially if reflux condensation of the evolved steam is not used, with the continuous evolution of steam from the boiling mixture. The water additions, however, should not be made so as to prevent or suppress the violence of the reaction; so they are begun after the violent reaction has kicked off and expanded the mass, are made intermittently so as to prevent the mass from expanding beyond a controllable level, but without reducing it to a quiescent state, and are continued for as long as needed for that purpose, for example, for a total period of about 20 to 25 minutes. The violent reaction then having run its course, the mass will subside to its normal volume of its own accord.

The reaction mixture is then digested at a temperature above 90° C., and at all events well below 105° C., while kept in vigorous agitation, for a period of hours sufficient to complete the required extraction of alumina from the silicate particles. The digestion is performed most advantageously at a temperature of 94° to 100° C. for a period of about 2 to 6 hours, with the use of external heat to maintain this temperature. This heat can be supplied by the introduction of steam directly into the mass or by heating the reaction vessel in any desired way, such as by a steam jacket or a gas fired or an electrically heated mantle.

During the digestion, the aqueous medium is kept at an acid concentration, calculated upon the amount of acid added to it and thus including both free and combined acid at this stage, of less than 50% and preferably between 20 and 40%. Such a concentration of approximately 30% is especially advantageous for the economical recovery of alum from the final reaction liquid. The concentration and the temperature desired for the digestion may be established by adding an additional quantity of relatively cold water to the reaction mixture when the exothermic reaction no longer tends to expand the mass and it has subsided to nearly its normal level. The dilution, however, should not bring the acid concentration below 15%, for this would prolong uneconomically the required period of digestion.

It is important that the acid concentration be less than 50% and the temperature less than 105° C. during the digestion. Higher acid concentrations and higher temperatures are deterimental to the recovery of the silica material with the desired high surface area and high porosity. In addition, they cause the silica material to be impregnated with detrimental amounts of acidity that cannot be removed by conventional filtration, washing and neutralization processes.

The properties and range of usefulness of the final silica material are greatly influenced not only by the conduct of the acid reaction but also by the conduct of the calcination. For example, a product obtained with a $SiO_2$ content of 67.5% by carrying out the calcination for 2 hours at 550° C. and reacting the resulting material, first exothermally and then by digestion for 4 hours at 94° C., in an aqueous suspension containing sulfuric acid in an amount equivalent to the $Al_2O_3$ content of the silicate, showed far less desirable properties, including a much lower reactivity, surface area and porosity, than do products produced in the same way excepting with the use of the anhydrous silicates resulting from calcinations for 2 hours at temperatures of 700° C., to 800° C. and 900° C., respectively. Comparative data on properties of the several products are shown in Table I hereinbelow. As shown in the same table, however, the more valuable materials according to the invention may be obtained in the same way from the anhydrous silicates resulting from calcinations for much longer times at 550° C.

Figure 2:
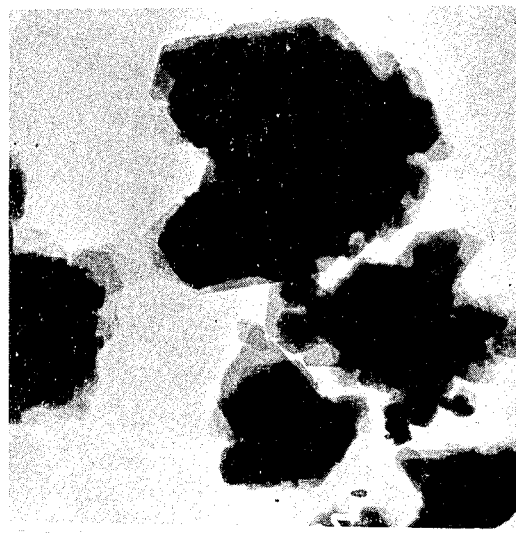

Some of the particle characteristics of silica materials provided according to the invention are evident from the electron micrographs reproduced on the accompanying drawing, in which:

FIG. 1 is a reproduction, somewhat reduced in size, of an electron micrograph showing a typical group of particles at 14,000 times their actual size; and FIG. 2 is a similar reproduction of a micrograph showing particles of the same material at 92,000 times their actual size.

As may be seen especially in FIG. 2, the elementary particles of the material have a definitely hexagonal facial form, and they are so thin and tenuous that they are almost transparent to the electrons. Although their hexagonal outlines resemble those of kaolinite particles, their extreme wafer-like thinness makes them readily distinguishable in appearance.

The materials and the process of the invention are further illustrated by the examples and the test data which follow.

Example A 1,000 grams of a koalin clay refined so as to have 55 to 60% of its particles smaller than 2 microns and only 20 to 25% of its particles coarser than 5 microns (an air-floated soft clay mined and refined at Langley, S.C.) was heated for 24 hours at 550° C., then cooled, and then dispersed thoroughly in 1505 grams of water containing 2.5 grams of tetrasodium pyrophosphate as a dispersing aid. The kaolin had a BET surface area of 14.9 m.$^2$/g. and the following typical composition:

|  | Percent |
|---|---|
| $Al_2O_3$ | 39.25 |
| $SiO_2$ | 45.12 |
| $Fe_2O_3$ | 0.71 |
| $TiO_2$ | 0.89 |
| CaO | 0.49 |
| MgO | 0.14 |
| $H_2O$ (combined) | 14.13 |

The dispersion of the heat-treated kaolin anhydride was acidified by the addition of 1190 grams of concentrated sulfuric acid (93.19%) having a specific gravity of 1.835. The acid was added quickly with vigorous agitation of the slurry, which was continued throughout the reaction. This quantity of acid was 100% of the amount stoichiometric to the $Al_2O_3$ content of the clay. It gave an acid concentration of 40.8% in the aqueous medium of the slurry.

Promptly after the completion of the acid addition, which itself brought the slurry to a considerably elevated temperature, a violent exothermic reaction occurred which in 2 minutes had resulted in a strong boiling and frothing action within the mass and a reaction temperature of 105° C. The mass was allowed to boil up in the reaction vessel to several times its normal volume. Then it was restrained against frothing farther, by the intermittent addition of tap water in increments of 100 to 200 grams each.

When the violent exothermic reaction had run its course and the mass had subsided to nearly its normal volume, a further addition of water was made to bring the slurry to a temperature of 94° C. and an acid concentration of 30%, calculated upon the amount of acid added at the outset. Altogether, 1,000 grams of water was used for the control of the frothing and the final adjustments of temperature and concentration.

The acid reaction was then completed by holding the slurry at 90° C. for 4 hours. At the end of this digestion period, the slurry was cooled and diluted with water and then filtered; the filter cake was washed with water to remove free acid and aluminum sulfate; and the washed solids were dried at about 105° C. and disintegrated in a pulverizer.

The silica material resuling was analyzed and tested in various ways, giving the data set forth in the last column of Table I.

Example B

The dispersion and acid reaction procedure of Example A was followed with the use of the heat-treated aluminum silicates resulting from the calcinations of the kaolin at 550° C. for periods of 2 hours and 8 hours, respectively, instead of 24 hours. The resuling final materials respectively gave the data set forth in the first and the next-to-last columns of Table I.

In the use of the silicate from the 2-hour calcination at 550° C., the acidified slurry did not reach a violent boiling condition. The maximum temperature measured was 96° C., and the slurry took 6 minutes to reach this temperature.

In the use of the silicate from the 8-hour calcination at 550° C., a boiling and frothing action occurred which brought the slurry to a measured temperature of 105° C. in 6 minutes, at which point the frothing control was initiated.

Example C

The dispersion and acid reaction procedure of Example A was followed with the use of the heat-treated aluminum silicates resulting from 2-hour calcinations of the kaolin at temperatures of 700° C., 800° C. and 900° C., respectively, instead of 24 hours at 550° C.

The resulting silica materials respectively gave the data set forth in the second, third and fourth columns of Table I.

In the use of the anhydrous silicate from the calcination at 700° C., the acidified slurry underwent a violent exothermic reaction bringing it in 4 minutes to a condition requiring the frothing control. Its measured temperature was then 105° C.

In the use of the silicates from the calcinations at 800° C. and 900° C., the exothermic reaction was extremely violent—so much so that it brought the respective slurries to measured temperatures of 111° C. and 113° C. in 1 minute in each case, raising their temperatures at the rate of about 65 to 70 degrees C. per minute and thus requiring immediate initiation of the frothing control.

Other examples and tests have shown that silica materials according to the invention are not obtainable by the use of calcination temperatures either below 500° C. or above 925° C. Such materials may be obtained by the use of hydrochloric acid or nitric acid in the acid decomposition stage, instead of sulfuric acid, although the latter generally is preferred because of its lower cost and the greater convenience and efficiency of its use. Phosphoric acid, however, is not effective to give such materials, as it has little exothermic reactivity with the silicate and it forms and leaves residual phosphate and objectionable acidity in the products obtained, which have neither the reactivity nor the porosity of the silica materials provided according to the present invention. The natural hydrous aluminum silicates suitable for use in the described process for the production of such materials include the various grades of finely divided refined kaolins commercially available, the weight of which is composed predominantly of discrete particles smaller than 10 microns in diameter.

TABLE I

| Chemical Analyses | Calcination for 2 hours | | | | Longer at 550° C. | |
|---|---|---|---|---|---|---|
| | 550° C. | 700° C. | 800° C. | 900° C. | 8 hr. | 24 hr. |
| Percent $SiO_2$ | 67.5 | 84.4 | 86.8 | 88.6 | 77 | 85.3 |
| Percent Bound, $H_2O$ (Loss at 900° C. from dry wt. at 105° C.) | 10.65 | 8.30 | 7.47 | 5.50 | 9.75 | 8.18 |
| Percent Metal Oxides | 21.85 | 7.30 | 5.73 | 5.90 | 13.24 | 6.52 |
| Reactivity—Percent of $SiO_2$ content soluble in 30 min. in 1-N NaOH at 50° C., from sample at 39.6 g. $SiO_2$/liter | 67.4 | 96.0 | 95.1 | 96.0 | 81.5 | 93.5 |
| Silanol Concentration micromols/m.² of flat surface area | 42 | 129 | 148 | 148 | 74 | 135 |
| Acidity-mol. eq./100 g | .005 | .004 | .003 | .003 | .004 | .005 |
| BET Surface Area: | | | | | | |
| Total, m.²/g | 200 | 398 | 457 | 457 | 313 | 418 |
| Flat area, m.²/g | 64 | 36 | 41 | 41 | 56 | 38 |
| Pore area, m.²/g | 136 | 362 | 416 | 416 | 257 | 380 |
| Percent of Surface Area in Pores | 68 | 91 | 91 | 91 | 82 | 91 |
| Percent of Volume in Pores | 15 | 36 | 40 | 55 | 26.5 | 39 |
| Oil Absorption, ml./100 g | 62 | 72 | 66 | 76 | 63 | 70 |
| Percent Water Absorption at 72 R.H. | 7 | 13.7 | 16.7 | 18 | 12.3 | 14.2 |
| Water Tolerance Given to Salt | .50 | .59 | .64 | .72 | .54 | .58 |

The silanol concentrations given herein were determined by use of the Zerewitinoff reagent method for determining active hydrogen, according to techniques described in Siggia, "Quantitative Organic Analysis Via Functional Groups" (Wiley & Sons, 1949), page 41, and Guenther, "Determination of Silanol with Grignard Reagent," Analytical Chemistry, vol. 3, No. 6 (June 1958), page 1118.

The numerical values of water tolerance given herein represent the number of milliliters of distilled water that is tolerated by a 100-gram sample of table salt containing 1% by weight of the conditioning material, up to the point at which the salt begins to coalesce or stick in a jar containing the sample, when the water is added from a burette in increments of 2 to 3 drops and the sample is tumbled in the jar for 1 to 2 minutes after each addition. Unconditioned table salt generally has a water tolerance of 0.06 to 0.18.

The term "kaolin" or "kaolin clay" as used herein includes those clays which in the raw state contain as their chief constituent one or more of the naturally occurring hydrous aluminum silicates, such as kaolinite or halloysite, the composition of which may be represented by the formula

$$Al_2O_3 \cdot 2SiO_2 \cdot nH_2O,$$

$n$ generally being 2. The naturally occurring hydrous aluminum silicates or clays useful according to the invention generally contain $SiO_2$ and $Al_2O_3$ in a weight ratio of between about 1.0 and about 1.5.

We claim:

1. A reactive, selectively sorptive silica material consisting essentially of discrete, hexagonal phylloidal particles containing, by analyses based upon their weight when dry at 105° C., from 75 to 92% of $SiO_2$, at least 5% of $H_2O$ and less than 15% of other oxides, said particles having a characteristic thickness of about .003 to .020 micron, their facial dimensions being in the range of from 0.1 to 5 microns, their BET surface area being in the range of from 300 to 500 m.² per gram, and at least 60% of their surface area being constituted by porosity in the particles.

2. A material as claimed in claim 1, said porosity being formed predominantly by pores smaller than .002 micron in diameter.

3. A material as claimed in claim 1, at least 80% of said $SiO_2$ content being soluble within 30 minutes in a 1-N aqueous solution of NaOH when said particles are reacted therein at 50° C. at a concentration equivalent to 39.6 grams of $SiO_2$ per liter of such solution.

4. A silica material as claimed in claim 1, said particles comprising silanol (SiOH) groups at a concentration of more than 20 micromols per m.² of the flat BET surface area of the particles.

5. A reactive, selectively sorptive silica material consisting essentially of discrete, hexagonal phylloidal particles containing, by analyses based upon their weight when dry at 105° C., from 83 to 92% of $SiO_2$, from 5 to 10% of $H_2O$, and not more than 10% of other oxides, the BET surface area of said particles being in the range of from 350 to 470 m.² per gram and at least 85% of their surface area being constituted by porosity in the particles.

6. A material as claimed in claim 5, said particles containing per 100 grams less than .01 molar equivalent of acidity.

7. A material as claimed in claim 5, over 90% of said $SiO_2$ content being soluble within 30 minutes in a 1-N aqueous solution of NaOH when said particles are reacted therein at 50° C. at a concentration equivalent to 39.6 grams of $SiO_2$ per liter of such solution.

References Cited

UNITED STATES PATENTS

| 2,027,948 | 1/1936 | Wollner et al. | 252—450 |
| 2,477,639 | 8/1949 | Mills | 252—450 |
| 2,485,626 | 10/1949 | Mills | 252—450 X |
| 2,731,326 | 1/1956 | Alexander et al. | 23—182 |
| 2,879,136 | 3/1959 | Maloney | 23—182 |
| 2,940,830 | 6/1960 | Thornhill | 23—182 |

OSCAR R. VERTIZ, *Primary Examiner.*

MAURICE A. BRINDISI, *Examiner.*

H. T. CARTER, *Assistant Examiner.*